United States Patent [19]

Tokitsu et al.

[11] 4,137,553
[45] Jan. 30, 1979

[54] METHOD AND APPARATUS FOR MAGNETICALLY RECORDING VEHICLE RUNNING CONDITIONS

[75] Inventors: Naoki Tokitsu, Chiryu; Muneo Saito, Kariya, both of Japan

[73] Assignee: Nippondenso Co., Ltd., Kariya, Japan

[21] Appl. No.: 756,065

[22] Filed: Jan. 3, 1977

Related U.S. Application Data

[63] Continuation of Ser. No. 564,208, Apr. 1, 1975.

[30] Foreign Application Priority Data

Apr. 9, 1974 [JP] Japan .................................. 49-41442

[51] Int. Cl.² ........................ G01D 1/16; G01D 15/12
[52] U.S. Cl. ................................... 360/6; 179/15.55 T
[58] Field of Search ............. 179/15.55 T; 340/172.5; 346/33 M, 33 D; 360/6, 7, 8, 32

[56] References Cited

U.S. PATENT DOCUMENTS

| 3,348,203 | 10/1967 | Allen | 179/15.55 T |
|---|---|---|---|
| 3,792,445 | 2/1974 | Bucks et al. | 360/6 |
| 3,805,270 | 4/1974 | Grant | 360/6 |
| 3,869,707 | 3/1975 | Cupp | 360/6 |

Primary Examiner—Jay P. Lucas
Attorney, Agent, or Firm—Cushman, Darby & Cushman

[57] ABSTRACT

In a method for magnetically recording a vehicle condition, a voltage proportional to a vehicle speed is sampled at a predetermined interval and converted into a code signal which is temporarily memorized by a memory. When the memorized data reach a predetermined amount, the data are transferred to be recorded by a magnetic tape for a period which is short enough not to prevent the memory from memorizing. When all the data have been recorded, a completion signal is generated to stop the tape, whereby the inter record gap is limited to minimum length.

3 Claims, 31 Drawing Figures

METHOD AND APPARATUS FOR MAGNETICALLY RECORDING VEHICLE RUNNING CONDITIONS

BACKGROUND OF THE INVENTION

This invention relates to a method and apparatus for magnetically recording running condition of a vehicle.

A conventional system of this kind comprises a magnetic disc rotated in proportion to a vehicle speed and a magnetic head through which pulse signals of a constant frequency are applied, whereby a vehicle speed is recorded. The conventional recording system described above is, however, disadvantageous in that only one turn of the magnetic disc is available to the recording and that the recording time varies with a vehicle speed.

Another conventional one utilizes a magnetic tape instead of a magnetic disc to which a vehicle speed is recorded. However, the recording time of the magnetic tape is at the most one or two hours, which, otherwise, require complicated speed reducing means to record the vehicle speed all day long.

SUMMARY OF THE INVENTION

It is the primary object of the present invention to provide a method and apparatus in which data on vehicle conditions are stored into temporarily memorizing means from which the data are transferred into a magnetic tape for a period shorter than the transferring period of the temporarily memorizing means.

It is another object of the present invention to provide a method and apparatus in which a data recorder is operated incrementally so that data are recorded by the magnetic tape only when the recording is necessary. It is further object of the present invention to provide a method by which all-day-long recording can be attained without complicated speed reducing means.

It is a still further object of the present invention to provide a method in which data on vehicle conditions are digitally encoded and stored into temporary memorizing means which can be materialized on an integrated circuit, whereby the recording device can be made compact.

DETAILED DESCRIPTION OF A PREFERRED EMBODIMENT

Figure 1:
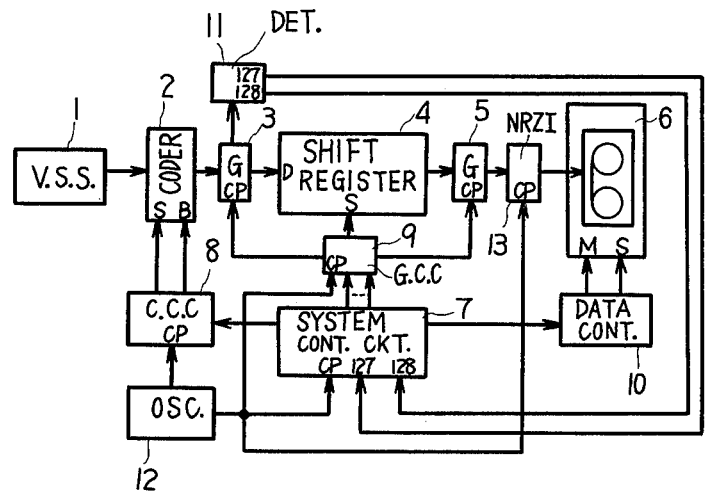
FIG. 1 is a block diagram for a first embodiment of the present invention.
Figure 2:
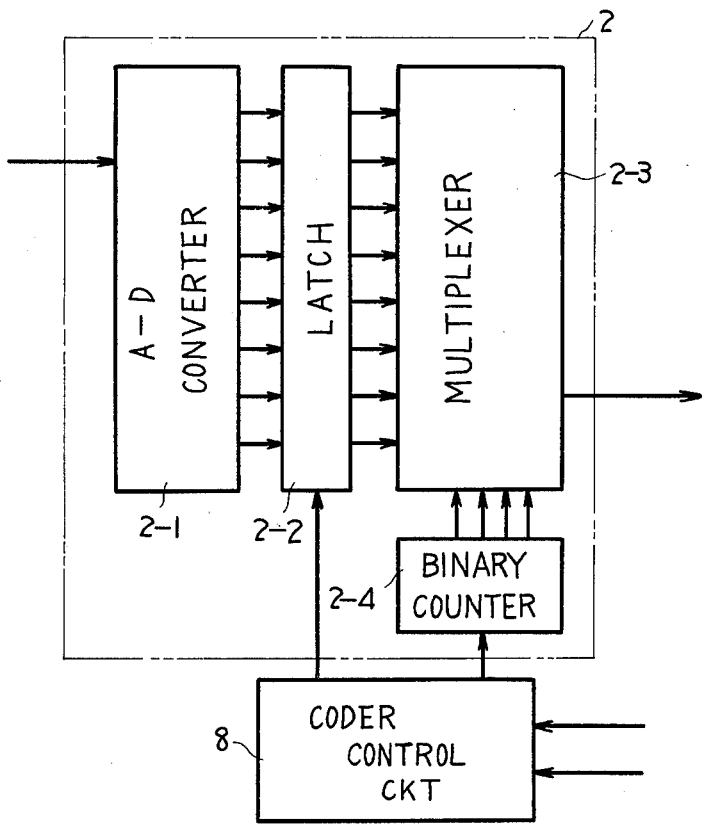
FIG. 2 is a partial block diagram showing a detailed construction of the coder circuit of the embodiment shown in FIG. 1.
Figure 3:
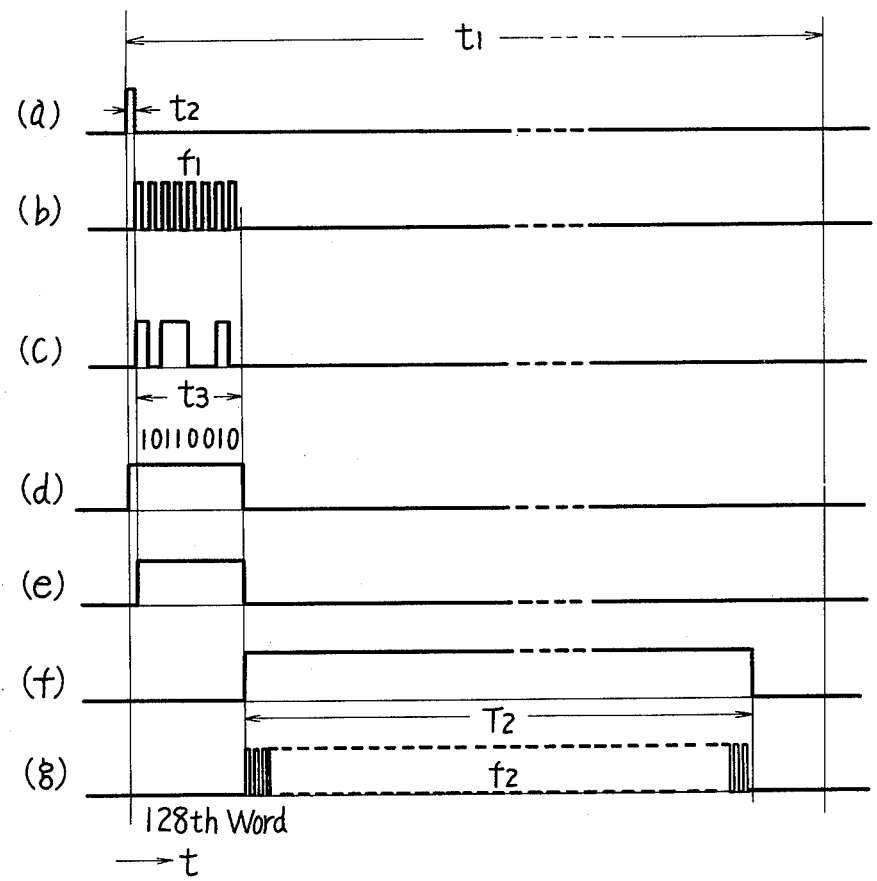
FIG. 3(a) — FIG. 3(g) are respectively signals for controlling the system of the first embodiment.

FIG. 1 shows a block diagram of a first embodiment of the system according to the present invention in which a static register of several kilobits is employed as a temporarily memorizing means. In the system, a vehicle speed sensor 1 composed of a conventional signal generator generates a voltage proportional to a vehicle speed. A coder 2 comprises an A-D converter 2-1, a latch circuit 2—2, a multiplexer 2-3, and a binary counter 2-4 as shown in FIG. 2. In the coder, the input signal of the vehicle speed sensor is converted into a 8-bit binary code by the A-D converter 2-1 and applied to the latch circuit 2—2 to be held thereby in a period t2, 9.5 milli-sec. for example, in response to a timing signal of a coder control circuit 8 which is shown in FIG. 3(a), and the binary counter 2-4 is supplied with eight pulses from the coder control circuit 8 during a period t3 as shown in FIG. 3(b). The input signals of the multiplexer 2-3 are selected in accordance with the output signals of the binary counter 2-4 to have its output of an 8-bit code "1, 0, 1, 1, 0, 0, 1, 0", for example, as shown in FIG. 3(c). The output signal of the multiplexer 2-3, that is, the output signal of the coder 2 is written into a shift register 4 through an input gate 3. The input gate 3 is opened by the signal produced by a gate control circuit 9 during the period t3 as shown in FIG. 3(e), thus transferring the signal from the coder 2 to the shift register 4. The shift register 4 is of MOS type and has a capacity of 1024 bits, in which the signal is written as a 8-bit signal at the initiation of eight shifting pulses produced by the gate control circuit 9 during the period t3. An output gate 5 is opened by a signal shown in FIG. 3(f) which is produced by the gate control circuit 9 during a period T2 to connect the shift register 4 to a Non Return to Zero change on one (hereinafter referred to as NRZI) circuit 13. In this transferring period T2, 1024 pulses are applied to a data recorder 6.

If the writing period T2 is 0.533 sec., the shifting pulse frequency f2 is:

$$f2 = (1024/T2) = (1024/0.533) = 1932 \text{ (Hz)}$$

The data recorder 6 comprises a magnetic tape recorder having a motor, a motor-driven capstan, a pinch roller and an electromagnetic solenoid. A coder control circuit 8 produces a timing signal for the latch circuit 2—2 as shown in FIG. 3(a) and the aforementioned eight pulses as shown in FIG. 3(b) by a combination with a signal produced by a system control circuit 7 and clock pulses produced by an oscillator 12. The frequency f1 of the eight pulses shown in FIG. 3(b), is obtained as follows if the opening period t3 of the input gate is 8 milli sec.:

$$f1 = 8/t3 = 8/8 = 1 \text{ (KHz)}$$

Figure 4:
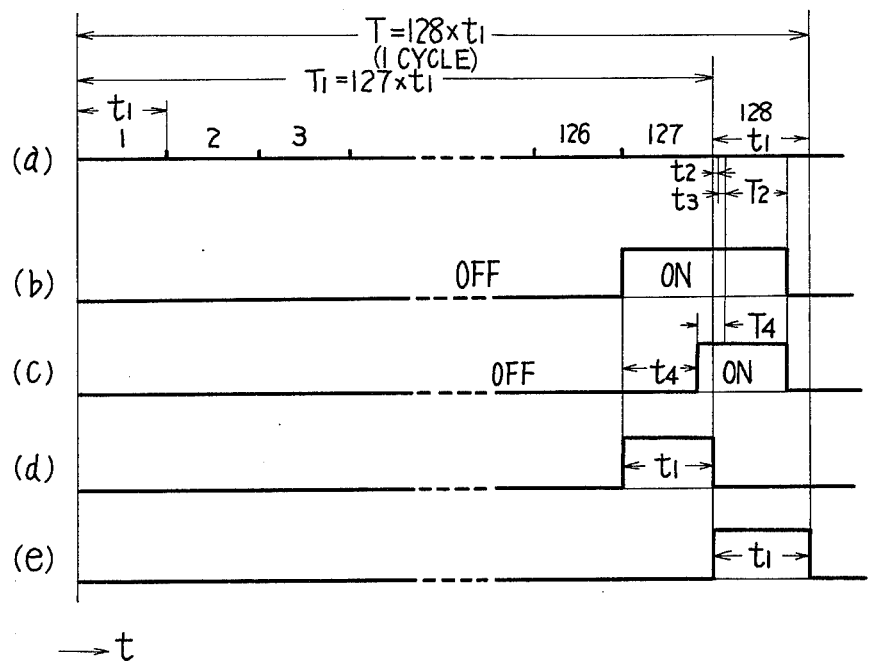
FIG. 4(a) — FIG. 4(e) are graphs showing time relations of the control circuits of the first embodiment.

The gate control circuit 9 produces the signals for opening the gates 3 and 5 by a combination with the signals of the system control circuit 7 and the oscillator 12. A data recorder control circuit 10 controls the capstan motor of the tape recorder 6 to drive a tape when the 127th word appears as shown in FIG. 4(b). The electromagnetic solenoid of the data recorder 6 pushes the pinch roller to the capstan to drive the magnetic tape when a motor response period t4 has passed after it was first energized as shown in FIG. 4(c). Since the magnetic tape recording is started immediately after the 128th word has been transferred to the shift register 4, if rise-up time of the magnetic tape is 100 milli sec., the motor response time t4 is:

$$t4 = t1 - (T4 - t3 - t2) = 100 - (100 - 8 - 0.5)$$
$$= 908.5 \text{ milli sec.}$$

A detector 11 which is composed of, for example, a counter detects the shift register to memorize the 127th word and, then, 128th word and generates the signals as shown in FIG. 4(d) and 4(e) respectively. The oscillator 12 supplies clock pulses to the system control circuit 7, the coder 8 and NRZI circuit 13. The NRZI circuit 13 symbolizes its input signal in the NRZI manner in response to the clock pulses of the oscillator 12 to record the output signal into the magnetic tape via the magnetic head.

In operation, when the vehicle runs at a speed V, the vehicle speed sensor generates a voltage v proportional to the vehicle speed V. The voltage v is transferred to the coder 2 where it is converted into a 8-bit binary code at the sampling time controlled by the system control circuit 7. In this embodiment as the quantum of the speed is 1 Km/h, the vehicle speed of 255 Km/h at the maximum can be defined. The 8-bit binary code converted by the coder 2 is written into the shift register 4 while the input gate 3 is opened by the gate control circuit 9. The written content of the shift register 4 is shifted to the right as each 8-bit code has been written one by one. The detector 11 counts the number of the input gate opening times thereby to detect the number of words written into the shift register 4. As described above, the signal which is sampled and quantized is written into the shift register 4 during the gate opening period t3 at every t1 interval. Now, if the sampling time is assumed 1 sec., the shift register is written with 1024 bit speed signals in 128 seconds. Therefore, 128 words are recorded by the shift register 4 as the 8-bit signal corresponds to one word. When the 127th word has been written into the shift register, the detector 11 sends a signal to the gate control circuit 7 to drive the motor of the data recorder 6, to thereby drive the capstan. As illustrated in FIG. 4(c), the electromagnetic solenoid of the data recorder 6 is energized after the motor response delay time t4 has elapsed, whereafter the pinch roller is pushed by the capstan to drive the tape. After the magnetic tape has started and reached an operation speed in a period t4, 128th word is written into the shift register 4 when the detector 11 produces a signal indicating the completion of the data recording. Upon receipt of the completion signal, the gate control circuit 7 supplies a control signal to the shift register control circuit 9, which closes the input gate circuit 3 and subjects the input terminal of the shift register 4 to logical zero level and, at the same time, opens the output gate circuit 5 to transfer the output of the shift register 4 to NRZI circuit 13. Thus, the recorded data on the shift register 4 is shifted to the right through 1024 steps in the period T2 as shown in FIGS. 3(g) and 4(a) and is transferred to the data recorder 6 to be recorded on the magnetic tape during the period T2. When the 1024 bit content of the shift register 4 has been shifted to the right, the gate control circuit 9 opens the input gate 3 again and, at the same time, closes the output gate 5 and stops the data recorder 6. Thus the same operation previously described is repeated to accumulate the history of the vehicle speed.

Figure 5:
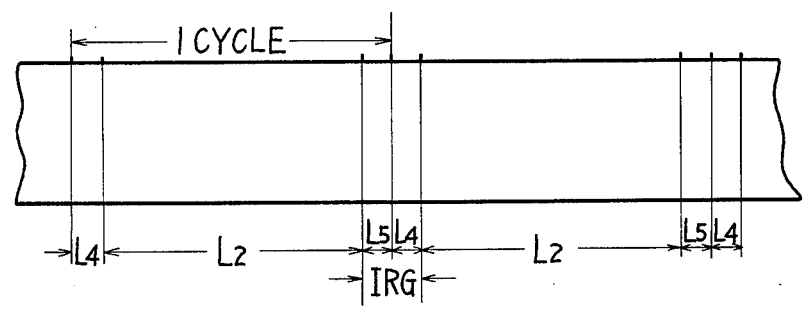
FIG. 5 shows a relation between recording length and inter record gap on the tape of the present invention.

In FIG. 5, a length L4 is carried during the period T4 in which the magentic tape starts running and reaches a normal running speed, a length L2 is carried for writing period T2 and a length L5 for the period T5 in which the energization of electromagnetic solenoid is stopped and, consequently, the magnetic tape stops completely. As a result the inter record gap (hereinafter referred to as IRG) of the magnetic tape is limited to its starting and stopping. The IRG of the system according to the invention is much shorter than the conventional system in which the vehicle speed is recorded into the magnetic tape every time it is sampled.

In this first embodiment, a single shift register is employed for temporary memorizing means. However it is readily apparent that a couple of shift registers may be employed in the system, in which when one of the shift registers has been transferred a predetermined amount of data, the data recorder 6 is operated to record all the data into the magnetic tape, while the other shift register is being transferred subsequent data until an amount of the data reaches a predetermined value which, in turn, is recorded into the magnetic tape next. A plurality of vehicle conditions in addition to the vehicle speed such as taxi's running distance and its carriage times can be also recorded by providing respective shift registers from which the data are recorded into the magnetic tape in such manner that the respective data are recorded into respective tracks of the same tape or that the respective data are recorded into the same track by a time sharing process. The shift register employed in the first embodiment may be substituted by another semiconductor memory, a dielectric memory, a capacitor, a magnetic tape, a magnetic disc and etc.

Figure 6:
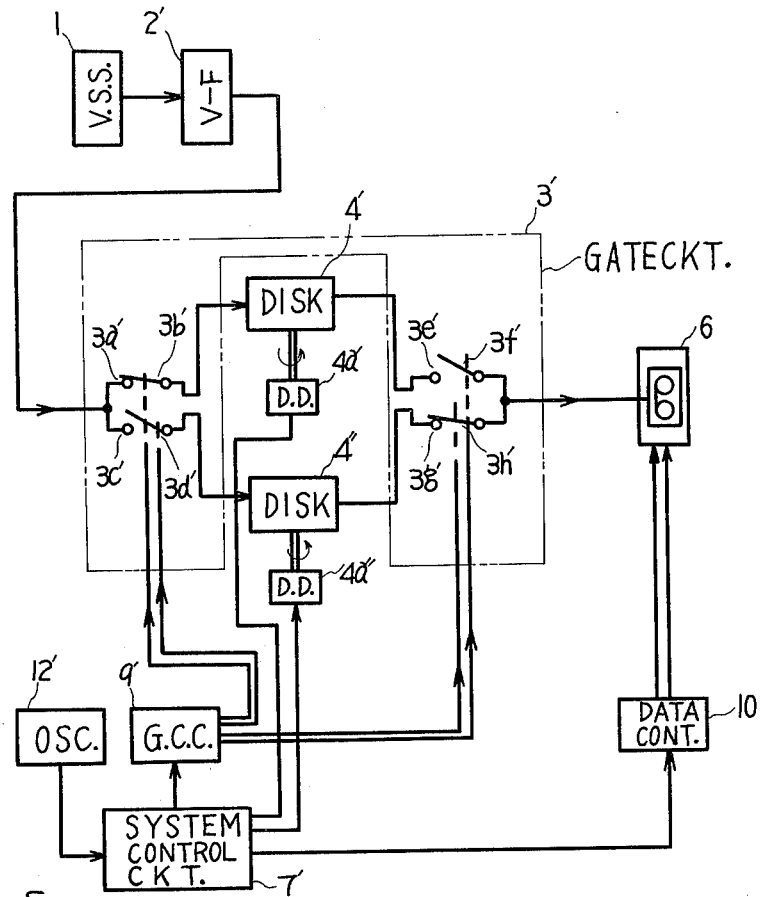
FIG. 6 is a block diagram for a second embodiment of the present invention.
Figure 7:
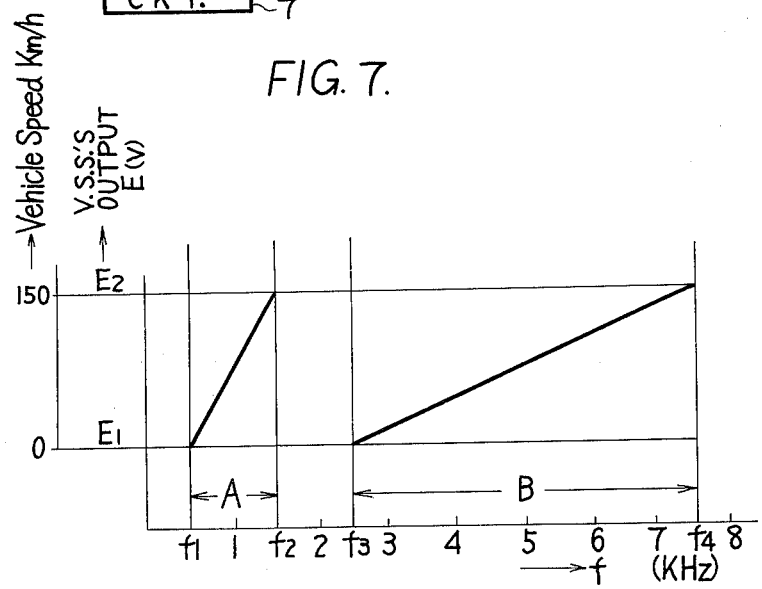
FIG. 7 is a graph showing relations between frequencies and vehicle speeds in the second embodiment.
Figure 8:
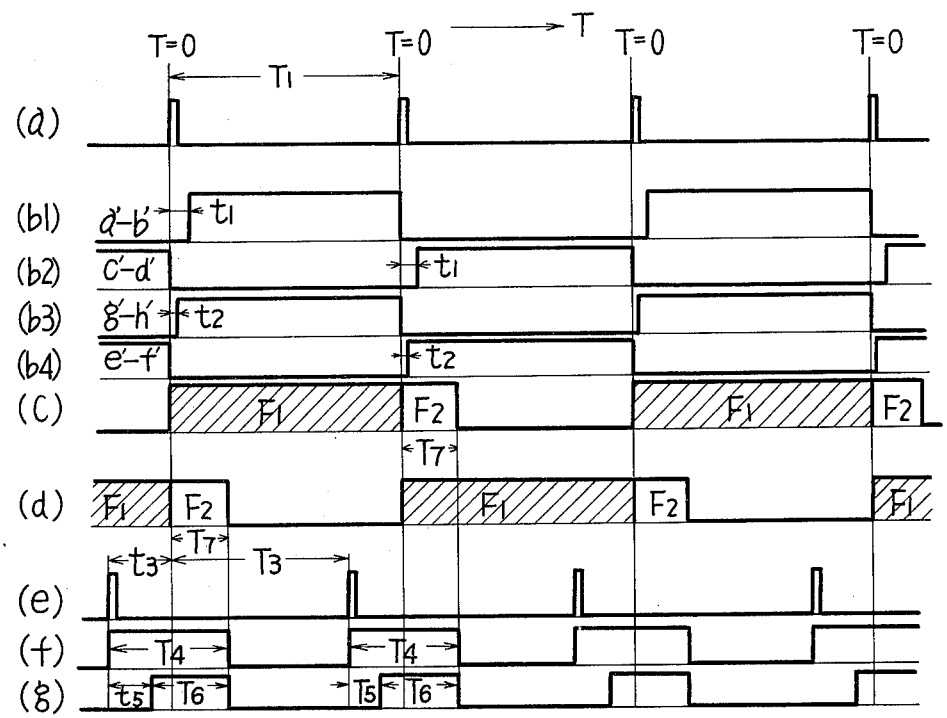
FIG. 8(a) — FIG. 8(g) are respectively signals for controlling the system of the second embodiment.
Figure 9:
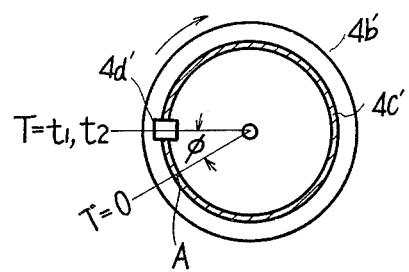
FIG. 9 shows a magnetic disc employed in the second embodiment.

FIG. 6 is a block diagram of a second embodiment in which a couple of magnetic discs are provided for temporary memorizing means. In the figure, a conventional frequency-voltage converter 2' generates a signal varying its frequency from f1 to f2 linearly in response to a voltage proportional to the vehicle sensed by a vehicle speed sensor 1, which is shown in FIG. 7. In FIG. 7, there is exemplified the frequency f1 corresponding to vehicle speed 0.5 Km/h and the frequency f2 corresponding to vehicle speed 150 Km/h. The output signal of the voltage-frequency converter 2' is always supplied to a gate circuit 3', which is composed of a known analog switch and operates to open and close in response to a signal of a gate control circuit 9'. Each of first and second magnetic discs 4' and 4" is linked with each disc driving means 4a' and 4a" composed of a pulse motor through a speed reduction device. Each of the discs 4' and 4" operates in such manner that one takes one turn in a period T1 as it is driven by a signal of frequency F1, while the other takes one turn in a period T7 as it is driven by a signal of F2 as shown in FIGS. 8(c) and 8(d), where the frequency F2 is equal to the frequency which is five times as much as F1. That is, when one of the discs is driven by the signal of the frequency F2, the disc rotates its one turn in the period T7 which is one fifth of the period T1. A data recorder 6 is the same construction as the first embodiment, which is driven by a data recorder control circuit 10 upon receipt of a trigger signal applied from system control circuit 7' in a period T3 after the time T = 0 as shown in FIG. 8(e). The motor of the data recorder 6 is driven during a period T4 as shown in FIG. 8(f). The magnetic tape starts running when a delay time t5 has passed since the magnetic solenoid of the data recorder 6 was actuated as shown in FIG. 8(g). The tape runs for a period T6 as shown in FIG. 8(g) and reaches its stable speed for recording at the time T = 0. An oscillator 12' comprises a conventional rectangular wave generator and generates clock signals for commanding the system operation as described in the first embodiment. A system control circuit 7' generates trigger signals for controlling the system as shown in FIG. 8(a) and control signals for controlling the pulse motors of the magnetic discs 4' and 4" as shown in FIG. 8(e). FIG. 9 shows a magnetic disc assembly which comprises a magnetic disc 4b' having a track 4c' thereon and a magnetic head 4 d'. In order to obviate a fluctuation of recording speed, the portion defined by an angle φ is reserved for idling. Before recording, a portion of the magnetic tape designated by "A" is located ahead of the magentic head 4d' by the angle φ. When the disc is driven by the signal of the frequency F1 the portion designated by "A" reaches the magnetic head 4d' in a period t1, where it maintains a normal running speed. On the other hand, when it is driven by the signal of the frequency F2 the portion reaches the head in a period t2, where it maintains a normal running speed. The first magnetic disc 4' starts its rotation at the time T = 0 and recording at the time T = t1 when the analog switch 3a'-3b' closes to transfer the data signals into the first disc 4', on the other hand, the second magnetic disc 4" starts its running at the time T = 0 with the frequency F2 and, after running in the period t2, the analog switch 3g'-3h' closes to transfer the temporarily recorded data on the second disc to the magnetic tape. It is noted that the frequency of the signal transferred to the magnetic tape ranges from f3 to f4, for example, 2.5 KHz to 7.5 KHz as shown in FIG. 7, which is five times as high as the frequency range generated by the frequency-voltage converter 2'.

In operation, the vehicle speed sensor 1 generates a voltage proportional to a vehicle speed, which the voltage-frequency converter 2' converts to pulse signals the frequency of which is proportional to the vehicle speed. The system control circuit 7' generates a trigger signal shown in FIG. 8(a), which is applied to the gate control circuit 3'. In synchronism therewith, the first data recorder driving circuit 4a' is applied the pulse signals of the frequency F1 and the second driving circuit 4a" is applied the pulse signals of the frequency F2 so that the respective discs can start rotation. A timing signal as shown in FIG. (b1) is applied from the gate control circuit 9' to the input of the analog switch 3a'-3b' to close it thereby transferring vehicle speed signals to the first magnetic disc. In this moment, the control signal for the other analog switch 3c'-3d' is kept at zero level so that no vehicle speed is transferred to the other disc. In the time t2 after T = 0, the other magnetic disc reaches its normal speed and, thereafter, a timing signal as shown in FIG. 8(b3) is applied from the gate control circuit 9' to analog switch 3g'-3h' to close thereby transferring the data on the second magnetic disc 4" to the magnetic tape in a short period which is one fifth of the period for the first magnetic disc to record. In this moment, the control signal as shown in FIG. 8(b4) keeps the analog switch 3e'-3f at zero level so that no signal is transferred to the magnetic tape. At the time ahead of T = 0, a trigger signal as shown in FIG. 8(e) is applied from the control circuit 7' to the data recording control circuit 10, which, upon receiving it, drives the motor during the time T4. In the period t5 after driving the motor, the magnetic solenoid is energized to drive the magnetic tape, thus to record the vehicle speed. Thereafter, another trigger signal is applied to the gate circuit 3' and, then, a timing signal as shown in FIG. 8(b2) is applied to the input of the analog switch 3c'-3d' to close to thereby transfer vehicle speed signals to the second disc 4" which is driven by the signal of the frequency F1. At the same time, the first magnetic disc 4' is driven by the signal of the frequency F2 to transfer the data on the first disc 4' to the magnetic tape through the analog switch 3e'-3f. In this moment, the analog switches 3a'-3b' and 3g'-3h' are respectively opened so that no signal is transferred therethrough. In this manner, the vehicle speed is recorded into the tape consecutively.

What is claimed is:

1. A method for magnetically recording vehicle running conditions comprising the steps of:

sensing a vehicle running condition to provide a continuous signal, converting said signal into a pulse signal varying in frequency in proportion to the magnitude of the sensed running condition, temporarily memorizing said pulse signals by alternately directing said signals for predetermined intervals to a pair of movable recording means, alternately moving said recording means at first and second speeds during said intervals whereby when one of said recording means moves at the first speed, the other of the recording means moves at the second speed, said second speed being faster than the first speed, transferring said temporarily memorized signals from said pair of movable recording means as each moves at said second speed and recording the transferred signals on a movable magnetic recording means, said transferring and recording occurring during further intervals each of which is shorter than one of said predetermined intervals, and stopping said magnetic recording means between said further intervals.

2. An apparatus for magnetically recording vehicle running conditions comprising:

means for sensing a vehicle running condition to provide a continuous signal, means for converting said signal into a pulse signal varying in frequency in proportion to the magnitude of the sensed running condition, a pair of movable recording means, means for alternately directing said signals for predetermined intervals to respective ones of said pair of movable recording means to thereby temporarily memorize said signals, means for alternately moving the respective ones of the recording means at first and second speeds during said intervals whereby when one of the recording means moves at the first speed, the other of the recording means moves at the second speed, said second speed being faster than the first speed, means for transferring said temporarily memorized signals from said pair of movable recording means as each moves at said second speed, movable magnetic recording means, means for recording the transferred signals on said magnetic recording means, said transferring and recording occurring during further intervals each of which is shorter than one of said predetermined intervals, and means for stopping said magnetic recording means between said further intervals.

3. An apparatus for magnetically recording vehicle running conditions comprising:

sensing means for sensing vehicle speed as a vehicle running condition to produce a pulse train varying in frequency in proportion to the sensed vehicle speed;

trigger means for producing trigger pulses at a fixed frequency;

means for producing first and second pulses at respective first and second fixed frequencies in response to each of said trigger pulses, said first frequency being higher than the fixed frequency of said trigger pulses and lower than said second frequency;

a pair of input transfer means for transferring said pulse train during the conduction thereof, said pair of input transfer means being rendered conductive alternately in response to said trigger pulses;

a pair of temporary memory means, each being connected to a respective one of said pair of input transfer means for alternately memorizing said pulse train transferred through said pair of input transfer means, and each being activated alternately by said first and second pulses such that each of said pair of temporary memory means alternately memorizes said pulse train at said first frequency;

a pair of output transfer means, each being connected to a respective one of said pair of temporary memory means for transferring said pulse train memorized in the corresponding one of said temporary memory means and each being rendered conductive alternately in response to said trigger pulses such that said pulse train is transferred at said second frequency; and a magnetic recording means for recording said pulse train transferred through said output transfer means, said magnetic recording means being operated periodically at said fixed frequency.

* * * * *